(12) United States Patent
Gach et al.

(10) Patent No.: US 9,306,619 B2
(45) Date of Patent: Apr. 5, 2016

(54) DIRECT SEQUENCE SPREAD SPECTRUM SIGNAL RECEIVING DEVICE AND METHOD

(75) Inventors: Robert Gach, Seysses (FR); Dominique Delbecq, Fonsorbes (FR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/354,064

(22) PCT Filed: Nov. 16, 2011

(86) PCT No.: PCT/IB2011/003023
§ 371 (c)(1),
(2), (4) Date: Apr. 24, 2014

(87) PCT Pub. No.: WO2013/072715
PCT Pub. Date: May 23, 2013

(65) Prior Publication Data
US 2014/0254637 A1  Sep. 11, 2014

(51) Int. Cl.
*H04B 1/709* (2011.01)
*H04B 1/7075* (2011.01)
*H04B 7/08* (2006.01)

(52) U.S. Cl.
CPC ............. *H04B 1/709* (2013.01); *H04B 1/7075* (2013.01); *H04B 7/0802* (2013.01); *H04B 2201/707* (2013.01)

(58) Field of Classification Search
CPC .................. H04J 13/10–13/14; H04J 13/0074; H04J 13/0007–13/007; H04B 7/0404; H04B 7/04–7/0897; H04B 1/709–1/7095; H04B 1/7073–1/7087; H04B 2201/7073–2201/70736
See application file for complete search history.

(56) References Cited

U.S. PATENT DOCUMENTS

| | | | |
|---|---|---|---|
| 6,671,311 B1 * | 12/2003 | Raphaeli et al. | ............... 375/142 |
| 7,599,424 B1 | 10/2009 | Feng et al. | |
| 7,729,677 B2 | 6/2010 | Saed et al. | |
| 7,822,140 B2 | 10/2010 | Catreux et al. | |
| 7,899,110 B1 | 3/2011 | Zhang et al. | |
| 2003/0227963 A1 | 12/2003 | Dafesh | |
| 2006/0050773 A1 * | 3/2006 | Yano | ............................. 375/148 |
| 2008/0310482 A1 | 12/2008 | Covell et al. | |

(Continued)

FOREIGN PATENT DOCUMENTS

WO       9859446 A1    12/1998

OTHER PUBLICATIONS

International Search Report and Written Opinion correlating to PCT/IB2011/003023 dated Sep. 28, 2012.

(Continued)

*Primary Examiner* — Dac Ha

(57) ABSTRACT

A direct-sequence spread spectrum signal receiving device may comprise a receiver unit, a chip sequence generating unit, a correlation unit, and comparison unit. The receiver unit may extract a chip stream from a radio-frequency signal, said chip stream containing a first chip sequence. The chip sequence generating unit may generate a plurality of trial chip sequences on the basis of a first trial chip sequence and on the basis of a plurality of index rotations. The correlation unit may determine a plurality of correlation values on the basis of said plurality of trial chip sequences and on the basis of said first chip sequence, each of said correlation values indicating a degree of correlation between a respective one of said trial chip sequences and said first chip sequence. The comparison unit may determine whether a maximum one of said correlation values exceeds a defined threshold value.

17 Claims, 4 Drawing Sheets

(56) References Cited

U.S. PATENT DOCUMENTS

| | | |
|---|---|---|
| 2009/0074034 A1 | 3/2009 | Min et al. |
| 2010/0091907 A1* | 4/2010 | Noh et al. .................... 375/302 |
| 2010/0158076 A1* | 6/2010 | Snlyely et al. ................ 375/130 |
| 2010/0254304 A1* | 10/2010 | Poegel et al. ................. 370/328 |
| 2011/0051612 A1* | 3/2011 | Van Driest et al. ........... 370/252 |
| 2011/0200074 A1 | 8/2011 | Crosta et al. |
| 2012/0008616 A1* | 1/2012 | McCulley et al. ............ 370/342 |
| 2012/0099474 A1 | 4/2012 | Gauthier |
| 2012/0114025 A1 | 5/2012 | Gauthier |

OTHER PUBLICATIONS

ATMEL: "AVR Low Power 2.4 GHz Transceiver for ZigBee, IEEE 802.15.4, 6LoWPAN, RF4CE, SP100, WirelessHART, and ISM Applications", AT86RF231-ZU, AT86RF231-ZF, 8111C—MCU Wireless—Sep. 2009, pp. 1-198.

* cited by examiner

DIRECT SEQUENCE SPREAD SPECTRUM SIGNAL RECEIVING DEVICE AND METHOD

FIELD OF THE INVENTION

This invention relates to a direct sequence spread spectrum (DSSS) signal receiving device and to a method of receiving a DSSS signal.

BACKGROUND OF THE INVENTION

DSSS is a modulation technique in which a bit stream is multiplied by a spreading code to generate a chip stream. The spreading code may be a pseudo-noise or pseudo-random sequence. The chip stream thus generated may also be referred to as the spread signal or the encoded signal. The chip stream may require a larger bandwidth than the original bit stream. However, the spreading technique may provide several advantages. For example, by using different spreading codes, several transmitters may use the same frequency spectrum simultaneously. Furthermore, narrow band interferences may be reduced.

ZigBee is a communication protocol based on DSSS. In ZigBee, a list of different symbols may be defined, each symbol comprising a fixed number of bits. Each symbol may, for example, comprise a sequence of M bits. For example, M=4. Each symbol may be encoded (spread) by first decomposing the respective bit sequence of M bits into an equivalent chip sequence of N chips and then multiplying the value of each chip of that bit sequence by the value of a corresponding chip of the spreading code. For example, N=32. Such multiplication may be defined, for example, as follows: 0*0=1, 0*1=0, 1*0=0 and 1*1=1. 1 and 0 may also be referred to as high and low, respectively.

The chip sequence thus generated, i.e., the spread symbol, may be decoded (de-spread) by applying the same spreading code again, i.e., by multiplying each chip of the spread symbol by a corresponding chip of the spreading sequence (spreading code). For example, a symbol may be encoded by multiplying its chip number I by chip number I of the spreading code, wherein I runs from 1 to N, I=1 corresponding to the first chip and 1=N corresponding to the last chip of the symbol (and of the spreading code). The original chip sequence representing the symbol may thus be reconstructed. It is noted that the receiving device needs to know the correct spreading code in order to be able to decode the received chip stream.

A received encoded chip stream may alternatively be decoded by correlating each newly-arriving chip sequence of length N (i.e., comprising a total of N chips) against a plurality of encoded trial symbols and by selecting as the decoded symbol the specific trial symbol for which the highest correlation number is obtained. The plurality of trial symbols may notably comprise every symbol of the communication protocol. For instance, in a ZigBee system comprising a total of $2^M$, e.g., $2^4$=16 different symbols, the plurality of trial symbols may comprise these $2^M$ symbols. The symbols may be identified as S0, S1, S2, . . . S_M, respectively; for instance, S0 to S16. For example, in the case of M=4, the S0 symbol and the S16 symbol may be defined as the bit sequences 0000 and 1111, respectively.

Detecting a DSSS encoded signal in a short time interval can be challenging, even if the receiving device knows the correct spreading code. One reason is that the spreading code needs to be aligned to the received chip sequence such that each chip of the received sequence is multiplied by the corresponding chip of the spreading code. However, the most recently received sequence comprising N chips does in general not comprise a single symbol but may comprise chips of two subsequent symbols, namely chips K+1 to N of a first symbol and chips 1 to K of a subsequent second symbol. However, a short detection time may notably be beneficial in an antenna diversity scheme. In the context of this application, antenna diversity is a method of selecting an optimum reception antenna among two or more available antennas.

In this application, a symbol period is the duration of one symbol, that is the inverse of a symbol rate. A bit period is the duration of one bit, that is the inverse of a bit rate. A chip period is the duration of one chip, that is the inverse of a chip rate. Thus, a symbol period may be a multiple of a bit period. A bit period may be a multiple of a chip period.

U.S. Pat. No. 7,729,677 B2 by Saed et al. describes a method of and a device for antennae diversity switching, in which the signal strength of a preamble of a packet received in a first antenna is sampled. If the signal strength is of sufficient magnitude, the associated antenna is selected as a reception antenna.

U.S. Pat. No. 7,599,424 B1 by Feng et al. proposes to determine signal quality values at a plurality of antennas after correlating data packets with corresponding spreading codes.

U.S. Pat. No. 7,899,110 B1 by Zhang and Yang describes a method of performing bit synchronisation in a spread spectrum receiver having a plurality of receive paths. Each receive path includes a correlator and a magnitude calculator. Outputs from the respective magnitude calculators of two or more of the receive paths are combined to form a combined signal. An antenna is chosen on the basis of multiple receiver channels.

SUMMARY OF THE INVENTION

The present invention provides a direct sequence spread spectrum (DSSS) signal receiving device and a method of receiving a DSSS signal as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
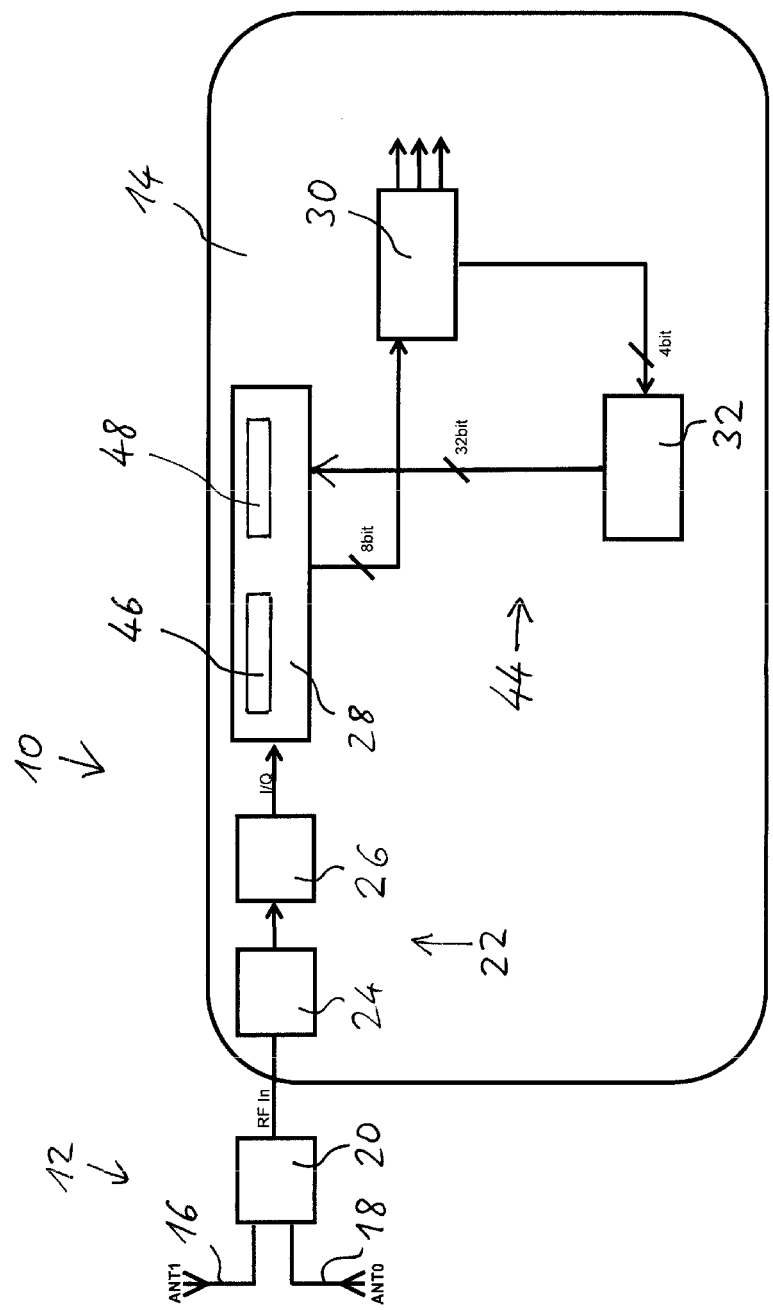
FIG. 1 schematically shows an example of an embodiment of a receiving device.

FIG. 1 schematically shows a receiving device 10 for receiving and decoding a spread signal. The receiving device 10 may comprise an antenna unit 12 and a signal processing unit 14 connected to the antenna unit 12.

The antenna unit 12 may be arranged to provide antenna diversity. It may comprise, for example, one or more antennas for receiving a radio frequency signal. In the shown example, the antenna unit 12 may comprise e.g. a first antenna 16 and a second antenna 18. The first antenna 16 and the second antenna 18 may have different characteristics. For example, they may be oriented differently relative to a housing (not shown) of the receiving device 10. Alternatively or additionally, the first antenna 16 and the second antenna 18 may be of different constructions types.

The antenna unit 12 may further comprise a switch 20 for selecting one of the two antennas 16 and 18 as an active antenna. An active antenna is an antenna that is connected to the signal processing unit 14 so as to transfer a radio frequency signal received by the respective antenna to the signal processing unit 14. The switch 20 may be arranged, for example, to connect either the first antenna 16 or the second antenna 18 to the signal processing unit 14. The antenna thus connected by the switch 20 may be referred to as the active antenna or as the selected antenna.

In the shown example, the receiver unit 22 may further comprise an analogue front-end unit 24 and a digital processing unit 26 connected to an output of the analogue front-end unit 24. The analogue front-end unit 24 may, for example, comprise one or more mixers (not shown) for downconverting a radio frequency signal received from the antenna unit 12 to an intermediary frequency. The digital processing unit 26 may, for instance, comprise one or more digital filters and decoding circuitry for converting the received analogue signal into a chip stream. The chip stream may notably be a binary chip stream. The digital processing unit 26 may be arranged to demodulate the analogue signal using a demodulation technique that is a counterpart to one of the following modulation techniques: binary phase shift keying (BPSK), quadrature phase shift keying (QPSK), offset quadrature phase shift keying (OQPSK), or any other binary modulating technique. The digital processing unit 26 may be arranged, for example, to provide the chip stream in the form of an IQ stream.

The signal processing unit 14 may further comprise a correlation unit 28 and a chip sequence generating unit 44. The chip sequence generating unit 44 may comprise, for example, a symbol generating unit 30 and an encoding unit 32. The chip sequence generating unit 44 may be connected to the correlation unit 28.

The receiving device 10 may operate, for example, as follows. An active one of the antennas 16 and 18 may generate an electrical radio frequency signal in response to an incident electromagnetic wave. The radio frequency signal may be fed via the switch 20 to the analogue front-end unit 24. The analogue front-end unit 24 may, for example, mix the received radio frequency signal with a local oscillator signal. It may further filter out undesired frequency components. For instance, the mixed signal may be filtered such that only a desired frequency band is retained.

The resulting analogue signal may be fed to the digital processing unit 26. The digital processing unit may demodulate the analogue signal to generate a chip stream, e.g., a binary chip stream. In the shown example, the chip stream may be provided in the form of an IQ data stream. The IQ data stream may comprise, for example, a binary I stream based on a sine waveform and a binary Q stream based on a cosine waveform.

The chip stream may be further fed to the correlation unit 28. The correlation unit 28 may extract a first chip sequence from the chip stream. The first chip sequence may, for example, have a length corresponding to one symbol. For instance, the first chip sequence may comprise a total of N chips, N being the total number of chips needed to represent one symbol. For example, N=32. The first chip sequence may comprise, for example, the latest N chips of the received chip stream. The correlation unit 28 may, for example, buffer the latest N chips of the chip stream in a first-in first-out (FIFO) buffer 46. The content of the FIFO buffer 46, i.e., the first chip sequence, may be updated with every newly-arriving chip.

The chip stream may be decoded, for example, as follows.

The symbol generating unit 30 may generate a plurality of trial symbols. The plurality of trial symbols may, for example, be the set of all symbols of a ZigBee protocol. This set may, for example, comprise a total of $2^M$ different ZigBee symbols, each symbol comprising M bits. For example, M=4, in which case there are 16 different symbols. The symbol generating unit 30 may feed these trial symbols to the encoding unit 32. The trial symbols may be fed to the encoding unit 32 sequentially or in parallel. Sequentially means one after the other. In parallel means simultaneously.

The encoding unit 32 may then multiply each of the trial symbols by a defined spreading code. The spreading code may, for example, be defined to coincide with a spreading code known to used by a transmitter (not shown). The transmitter may be arranged at a distance from the antenna unit 12. The encoding unit 32 may then feed the encoded (i.e., spread) trial symbols to the correlation unit 28. The encoded symbols may be fed to the correlation unit 28 sequentially or in parallel. In the shown example, the encoded trial symbols may be fed to the correlation unit 28 sequentially, i.e., one after the other. The most recent one of the encoded trial symbols may be stored in a second buffer 48 of the correlation unit 28. The second buffer 48 may, for example, be a register. The content of the second buffer 48 may thus represent a trial chip sequence.

The correlation unit 28 may further compare the first chip sequence (stored, for example, in the first buffer 46) to each of the trial chip sequences (stored, for example, in the second buffer 48). For example, the correlation unit 28 may compute, for each trial chip sequence, a correlation value which indicates a degree of correlation between the first chip sequence and the respective trial chip sequence. The correlation value may, for example, be a sum over each chip value of the first chip sequence multiplied by the corresponding chip value of the trial chip sequence. The correlation unit 28 may feed the thus determined correlation values to the symbol generating unit 30.

The symbol generating unit 30 may determine whether one of these correlation values exceeds a defined threshold value. It may further output the specific symbol for which the correlation value exceeds the defined threshold value, as a detected symbol. The detected symbol may also be referred to herein as the decoded symbol. In other words, the chip sequence generating unit 44 and the correlation unit 28 may cooperate to decode the received chip stream.

It is important to note that when the receiving device 10 is operated as described above, the first chip sequence, e.g. the latest N chips of the received chip stream, are correlated against trial chip sequences representing entire symbols. In other words, each of the trial chip sequences may have a first chip (chip number 1) corresponding to the start of the respective symbol and a final chip (for example, chip number N) corresponding to the end of that symbol. This implies that the first chip sequence and the trial chip sequence may have a large correlation value only when the first chip sequence also represents one entire symbol. As the first chip sequence contained, for instance, in the first buffer 46 may be updated with each newly-arriving chip, the first chip sequence may correlate with one of the trial symbols only at every N-th chip period. In other words, the first chip sequence may be aligned relative to each of the trial chip sequences only at every N-th chip.

This further implies that starting from the instant of receiving a first chip, there may be a lapse of nearly up to two symbol periods until a symbol may be first detected. In a worst case scenario, the first received chip is chip number 2 of a certain encoded symbol received via the antenna unit 12. The symbol comprising this first received chip will not necessarily be detected because it will never be fully contained in the first buffer 46, chip number 1 having been missed. In other words, chips number 2 to N may be useless if chip number 1 has been missed. In this case, a detection signal may be generated not before the next symbol has been buffered, i.e., when the first chip sequence is a full symbol. This may occur only after N−1+N=2N−1 chip periods after said initial instant.

Figure 2:
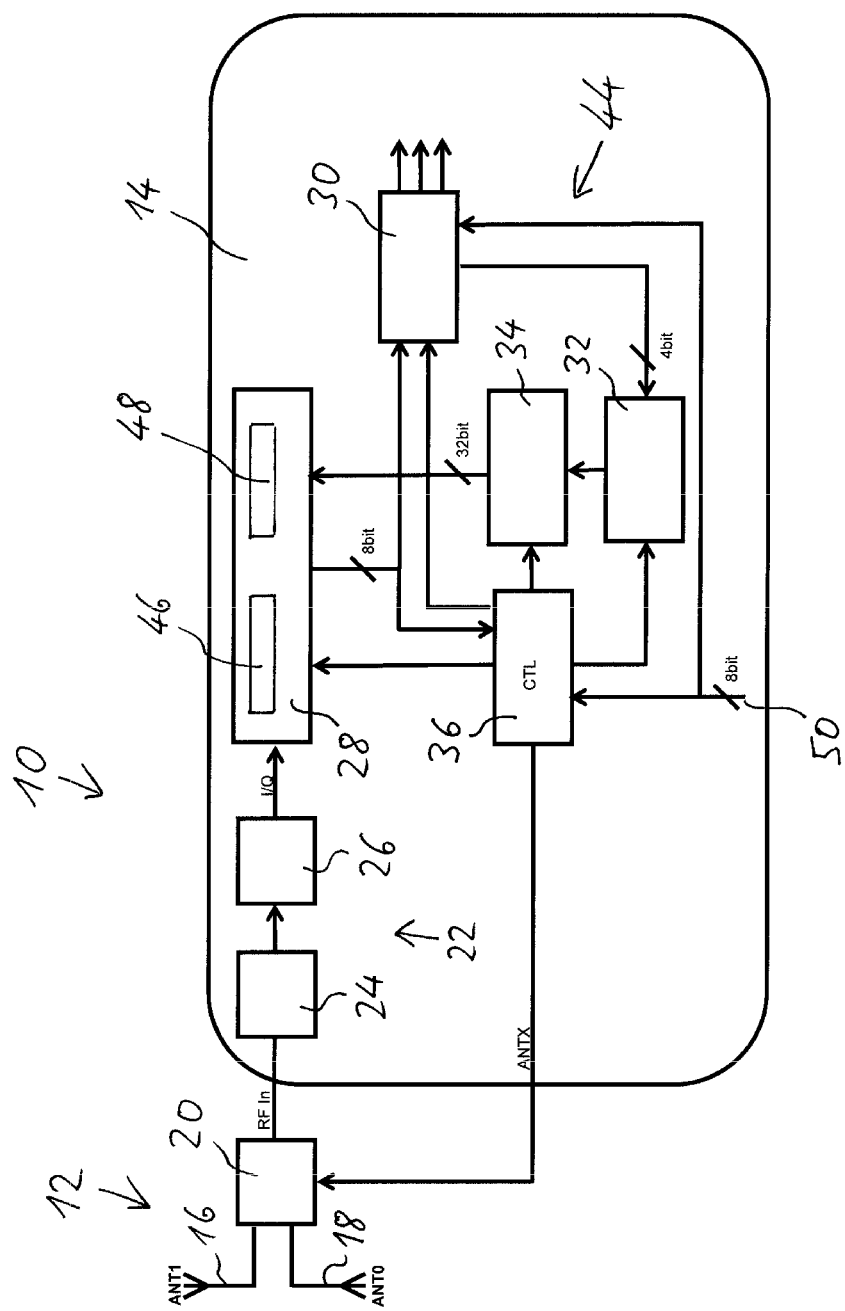
FIG. 2 schematically shows another example of an embodiment of a receiving device.

FIG. 2 schematically illustrates an example of another embodiment of the receiving device 10. The receiving device 10 has a faster signal detection mechanism. The receiving device 10 may be operable, for example, in accordance with a ZigBee protocol, and it may comprise a Fast Antenna Diversity system. The receiving device 10 may notably be arranged to detect whether the first chip sequence, e.g. the latest N chips of the received chip stream, is part of a succession of identical symbols. Such succession of identical symbols may be contained, for example, in a preamble of a data packet emitted by a ZigBee transmitter. For instance, such preamble may contain a succession of e.g. eight S0 symbols.

The receiving device 10 may comprise, for example, the receiver unit 22, the chip sequence generating unit 44, the correlation unit 28, and a control unit 36. The control unit 36 may notably comprise a comparison unit 38. In another embodiment, the comparison unit 38 may be arranged outside the control unit 36. For example, the comparison unit 38 may be integrated in the symbol generating unit 30.

The receiver unit 22 may extract, in a detection phase, a chip stream from the radio-frequency signal. The chip stream may comprise a first chip sequence having a length of one symbol. The first chip sequence may be any chip sequence contained in the received chip stream; it may notably comprise the most recent chips of the received chip stream. The chip sequence generating unit 44, the correlation unit 28 and the comparison unit 38 may analyze the first chip sequence in order to determine whether it is part of a preamble of a data packet, e.g. of a ZigBee data packet.

For example, the chip sequence generating unit 44 may generate, in the detection phase, a plurality of trial chip sequences on the basis of a first trial chip sequence representing a first trial symbol and on the basis of a plurality of index rotations. Each trial chip sequence may be index-rotated relative to said first trial chip sequence by one of said index rotations. When N is the total number of chips of the first chip sequence, and of the first trial chip sequence (e.g. N=32), the plurality of index rotations may comprise all 32 different index rotations of the index sequence (1, 2, 3, . . . , N). An example set of 32 rotated trial sequences is described further below.

The trial chip sequence generating unit 44 may comprise, for example, the symbol generating unit 30, the encoding unit 32 and a rotation unit 34. The symbol generating unit 30 may generate, in the detection phase, the first trial symbol. The encoding unit 32 may generate, in the detection phase, the first trial chip sequence by applying a spreading code to the first trial symbol. The spreading code may for example be a pseudo-noise chip sequence comprising a total of N chips. The first trial symbol may be part of a preamble of a data packet. For example, the first trial symbol may be a ZigBee S0 symbol. The rotation unit 34 may then rotate the encoded (spread) trial symbol through its N different rotational states, to generate the plurality of trial chip sequences.

The correlation unit 28 may determine, in the detection phase, a plurality of correlation values on the basis of said plurality of trial chip sequences and on the basis of said first chip sequence. Each of said correlation values may indicate a degree of correlation between a respective one of said trial chip sequences and said first chip sequence.

The comparison unit 38 may determine, in said detection phase, whether a maximum one of said correlation values exceeds a defined threshold value. It is noted that the maximum correlation value exceeding the threshold value may be an indication that the first chip sequence correlates sufficiently well with one of the trial chip sequences.

A detection phase which results in a maximum correlation value that is above the threshold value may be referred to as a successful detection phase. A detection phase which results in a maximum correlation value that is below the threshold value may be referred to as an unsuccessful detection phase.

The receiving device 10 may further comprise the antenna unit 12 and an antenna control unit 40, for example. The antenna unit 12 may comprise one or more antennas, e.g. the antennas 16 and 18, for receiving the radio-frequency signal. The antenna unit 12 may have at least two different operating modes. Each operating mode may be characterized, for example, by a set of active antennas, an orientation of said antennas, or a combination thereof. The antenna control unit 40 may select another operating mode of the antenna unit 12 in response to the maximum correlation value being below the threshold value, i.e. in the event of an unsuccessful detection phase. For example, the antenna control unit 40 may deactivate one antenna, e.g. antenna 16, and activate another one, e.g. antenna 18, of the antennas 16, 18, e.g. by controlling the switch 20. The receiving device 10 may further initiate a new detection phase after the antenna control unit 40 has selected the other operating mode.

The receiving device 10 may further comprise a power control unit 42. The power control unit 42 may set the receiving device 10 into a sleep mode in response to the maximum correlation value being below the threshold value. More specifically, the power control unit 42 may set the receiving device 10 into a sleep mode after several (e.g. three, ten or thirty) unsuccessful detection phases.

The detection phase described above may be a first detection phase. The receiving device 10 may further initiate a second detection phase in response to the maximum correlation value exceeding the threshold value, i.e. in the event of a successful first detection phase. The second detection phase may provide an additional test as to whether the receiving device 10 is able to decode the chip stream received from the active antenna.

For example, the correlation unit 28 may be arranged to determine, in the second detection phase, a plurality of second correlation values on the basis of the plurality of trial chip sequences and on the basis of a second chip sequence contained in the chip stream. Like the first chip sequence, the second chip sequence may have a length of one symbol. The first chip sequence and the second chip sequence may, for example, be subsequent chip sequences or partly overlapping chip sequences. Each of the second correlation values may indicate a degree of correlation between a respective one of the trial chip sequences and the second chip sequence. The comparison unit 38 may be arranged to determine, in the second detection phase, whether a maximum one of the second correlation values exceeds the threshold value, i.e. whether the second detection phase is successful.

The receiving device 10 may be further arranged to initiate a decoding phase in response to the maximum second correlation value exceeding the threshold value. The decoding phase may thus be performed with the antenna unit 12 locked to the operating mode for which the preceding second detection phase was successful.

For example, the chip sequence generating unit 44 may be arranged to generate, in the decoding phase, a plurality of third trial chip sequences representing a plurality of trial symbols. The trial symbols may comprise, for example, all symbols of a ZigBee protocol, e.g. a total of 16 different symbols. The correlation unit 28 may be arranged to determine, in the decoding phase, a plurality of third correlation values on the basis of the plurality of trial chip sequences and on the basis of a third chip sequence contained in the chip stream. The third chip sequence may have a length of one symbol. Each of the third correlation values may indicate a degree of correlation between a respective one of the third trial chip sequences and the third chip sequence. The comparison unit 38 may be arranged to determine, among the plurality of trial symbols, the trial symbol associated with the highest one of the third correlation values. The comparison unit 38, or any other suitable unit, e.g. the symbol generating unit 30, may further output this trial symbol as a detected symbol. The decoding phase may be performed repeatedly, e.g. at a symbol rate of the chip stream, or in response to each newly received chip sequence having a length of one symbol.

In the shown example, the chip sequence generating unit 44 may comprise, in addition to the components described above in reference to FIG. 1, a rotation unit 34, and a control unit 36. The control unit 36 may be implemented as or be integrated in an antenna diversity controller. The rotation unit 34 may be connected between the encoding unit 32 and the correlation unit 28. The control unit 36 may be connected to, for example, the antenna unit 12, the correlation unit 28, the rotation unit 34, and the symbol generating unit 30. In the example, the signal processing unit 14 may further comprise an input 50 for setting the threshold value mentioned above in reference to FIG. 1. The threshold value may be programmable, e.g. register-programmable.

The control unit 36 may notably be arranged to initiate a first detection phase, a second detection phase, and a decoding phase, as will be described below.

In the first detection phase, the control unit 36 may control the encoding unit 32 such that the encoding unit 32 feeds a specific encoded (spread) trial symbol to the rotation unit 34. This trial symbol may, for instance, be a symbol contained in a preamble expected in the chip stream. The trial symbol may, for instance, be an S0 symbol of a ZigBee protocol. The S0 symbol may be the bit sequence 0000, for example. The control unit 36 may further enable the rotation unit 34 to apply a plurality of index rotations to that specific trial chip sequence (i.e., to the encoded trial symbol) received from the encoding unit 32. The plurality of index rotations may notably comprise every possible index rotation of the index sequence 1, 2, 3, . . . , N−1, N.

Accordingly, the plurality of trial chip sequences generated by the rotation unit 34 may comprise the following chip sequences (each line contains one chip sequence):

(C_1, C_2, C_3, ... , C_N−1, C_N)

(C_2, C_3, C_4, ... , C_N, C_1)

(C_3, C_4, C_5, ... , C_1, C_2)

...

...

...

(C_N−1, C_N, C_1, ... , C_N−3, C_N−2)

(C_N, C_1, C_2, ... , C_N−2, C_N−1)

where C_K (K=1, . . . , N) may be either 0 or 1.

The first one of these sequences may represent one full symbol, e.g. the S0 symbol of a ZigBee system. Each of the other sequences then represents a certain sequence of N chips contained in a succession of two identical symbols, e.g. contained in the sequence S0 S0 in a ZigBee system. For example, the sequence (C_3, C_4, C_5, . . . , C_1, C_2)

may comprise the final N−2 chips, i.e. C_3 to C_N, of a first symbol having the value S0 and the first two chips, i.e. C_1 and C_2, of a subsequent second symbol having the same value S0.

Each of these rotated sequences may be used as a trial sequence to be compared against the first chip sequence, buffered e.g. in the FIFO buffer 46.

Using the set of rotated chip sequences as trial chip sequences may be particularly beneficial for detecting a preamble in the received chip stream if that preamble comprises a succession of at least two identical symbols, for example, a succession of at least two S0 symbols of a ZigBee protocol. As noted above, a preamble of a ZigBee data packet may comprise a succession of several S0 symbols, e.g. a total of eight S0 symbols.

Indeed, when a segment of N chips of that succession of S0 symbols has been stored in the first buffer 46 as the first chip sequence, it may be detected, e.g. quasi instantaneously, by comparing it against each of the rotated versions of the encoded S0 symbol. While in the embodiment described above in reference to FIG. 1, a detection signal would only be generated when one full S0 symbol is residing in the first buffer 46, the present detection mechanism may also respond when the first buffer 46 is occupied by a portion of a first S0 symbol and a portion of a subsequent second S0 symbol. The detection time may thus be reduced by up to one symbol period as compared to the embodiment described above in reference to FIG. 1.

The control unit 36 may trigger an appropriate action in response to determining that one of the trial chip sequences fed to the correlation unit 28 correlates sufficiently well with the first chip sequence contained in, e.g., the first buffer 46. More specifically, it may trigger such action in response to the respective correlation value exceeding the defined threshold value. The threshold value may be set for example via the port 50.

Similarly, the control unit 36 may trigger an appropriate action in response to none of these trial sequences correlating sufficiently well with the first chip sequence. More specifically, it may trigger such action in response to the respective correlation value being below the threshold value. For example, the control unit 36 may control the switch 20 to select another one of the antennas 16 and 18. Alternatively, the control unit 36 may set the receiving device 10 into a power saving mode. For instance, it may set the receiving device 10 into a power saving mode after a specified period during which no symbol was detected.

The control unit 36, in response to one of the correlation values associated with the rotated trial chips sequences exceeding the threshold value, may further initiate a second detection phase. The second detection phase may be identical in principal to the first detection phase. Notably, a second chip sequence contained in the received chip stream may be correlated against at least one trial chip sequence provided by e.g. the rotation unit 34.

The second detection phase may reduce a risk of false detections that may occur if the result of the first detection phase is used as a final detection result without further verification. It may be impossible to exclude false detections due to the fact that a DSSS encoded signal resembles noise. In fact, a false detection may be statistically possible in both the first and in the second detection phase when the antenna unit 12 receives pure "white" noise.

The first detection phase in combination with the second detection may virtually eliminate the risk of a false detection. The remaining risk may still be non zero, but may be expected to be below any defined symbol error rates of the ZigBee specification, for example. The time or distance (measured in chips) between detections may determine the susceptibility for a false detection as a tradeoff with speed of the overall detection decision.

In a first embodiment of the second detection phase, the second chip sequence may be correlated against each of the rotated trial chip sequences, to generate a plurality of correlation values corresponding to the plurality of index rotations.

In a second embodiment of the second detection phase, the rotation unit 34 may provide only a single trial chip sequence based on the particular index rotation which in the first detection phase produced the highest correlation value. In other words, in the second detection phase, the rotation unit 34 may be locked to a specific rotation.

The second chip sequence may, for instance, be the sequence of N chips comprising the latest P chips of the first chip sequence and the subsequent N–P chips of the received chip stream. Depending on the design, P may be any integer number in the range of zero to N–1. In the case of P=0, the second chip sequence is subsequent to the first chip sequence; that is, the first chip (i.e. chip number 1) of the second chip sequence is the immediate successor to the last chip (i.e. chip number N) of the first chip sequence. In contrast, in the case of P greater than zero, the first chip sequence and the second chip sequence partly overlap.

For example, P may equal N/2 (assuming that N is a pair number), in which case the first N/2 chips of the second chip sequence coincide with the last N/2 chips of the first chip sequence.

It is noted that the choice P=0 ensures that the second chip sequence is completely independent from the first chip sequence. This means that the second correlation values may add a maximum amount of information to the information already provided by the first correlation values. On the other hand, the choice P=0 implies that a total of N+N=2N chips (N chips of the first chip sequence plus N chips of the second chip sequence) need to be received in order to be able to generate the second correlation values.

In contrast, choosing P greater than zero, e.g. P=N/2, may allow to generate the second correlation values after receiving a total of only 2N–P chips (N chips of the first chip sequence plus the last N–P chips of the second chip sequence). The total response time or detection time of the receiving device 10 may thus be reduced, at the expense of a loss of informative value of the second correlation values. In practice, P=N/2 may be a good compromise between detection speed and reliability. Shorter times would be faster but risk false detections. In other words, it may be a compromise between robustness and rapidity.

The control unit 36 may further initiate a decoding phase in response to the maximum second correlation value (determined in the preceding second detection phase) exceeding the defined threshold value. In the decoding phase, the antenna unit 12 may be operated in the same mode as in the preceding first and second detection phases. For instance, the same set of active antennas may be used. Furthermore, these active antennas may be orientated in the same spatial directions as during the first and second detection phases. In the decoding phase, the rotation unit 34 may be locked to the particular rotation that resulted in the highest correlation value in the second detection phase.

While in the first and second detection phases, the encoding unit 32 may be controlled to output only one chip sequence, for example representing an S0 symbol of a ZigBee protocol, the encoding unit 32 may in the decoding phase generate a plurality of chip sequences, each chip sequence representing a specific symbol. The decoding phase may thus comprise the operations described above in reference to FIG. 1. The decoding phase may be repeated after each newly detected symbol of the received chip stream. For example, the decoding phase may be performed at the symbol rate of the received chip stream. Thus, the decoding phase may produce one detected symbol for every encoded symbol that is newly delivered by, e.g., the digital processing unit 26.

Otherwise, if the correlation value determined in the second detection phase is below the defined threshold value, the control unit 36 may again initiate a first detection phase as described above.

Figure 3:
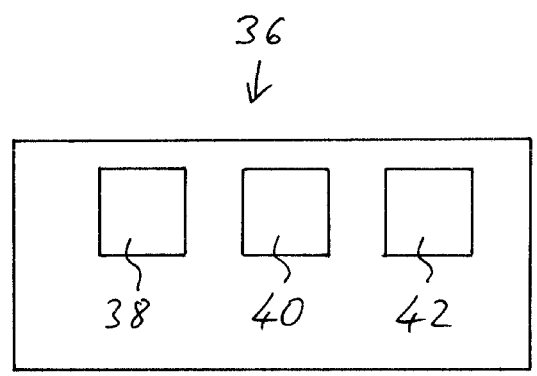
FIG. 3 schematically shows an example of an embodiment of a control unit.

FIG. 3 schematically illustrates an example of the control unit 36. The control unit 36 may comprise, for example, the comparison unit 38 for determining whether one of the correlation values exceeds the threshold value. The control unit 36 may further comprise the antenna control unit 40 for selecting another operating mode of the antenna unit 12. The control unit 36 may further comprise the power control unit 42 for setting the receiving device into a sleep mode.

Figure 4:
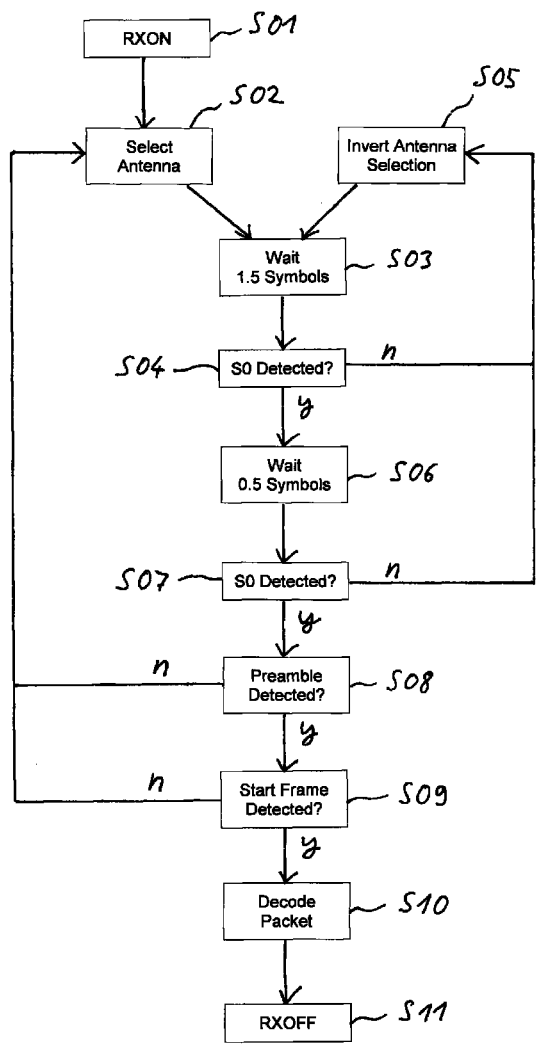
FIG. 4 schematically shows a flow chart of an example of an embodiment of a method of receiving a spread signal.

FIG. 4 shows a flow chart of an example of a method of receiving a DSSS encoded signal. In block S01 the receiver 10 described above in reference to FIGS. 2 and 3 may be switched on.

In block S02, a first set of antennas may be selected as active antennas. For example, the antenna 16 may be selected.

In block S03, the chip stream derived from the received radio frequency signal may be passed through the first buffer 36 for a duration of for example 1.5 symbols. The buffers content after this period may then provide the first chip sequence.

In block S04, this first chip sequence may be correlated against each of the plurality of trial chip sequences. Each trial chip sequence may be a rotated version of a defined symbol value, for instance of an S0 symbol of a ZigBee protocol.

If none of the correlation values thus determined exceeds a defined threshold value, another set of active antennas may be selected in block S05. For example, if antenna 16 was active in block S03, antenna 18 may be selected in block S05. From block S05, the process flow may continue with block S03 described above.

If, however, in block S04 it is determined that one of the correlation values relating to the first chip sequence defined in block S03 exceeds the defined threshold value, the process may proceed in block S06. In block S06, the received chip stream may further be passed through the buffer 46 for a duration of e.g. 0.5 symbols. The buffer's content may thus be shifted by the length of e.g. one entire symbol or e.g. half a symbol relative to its content in the first detection phase, to provide the second chip sequence.

In block S07, the second chip sequence may be correlated against each of a plurality of trial chip sequences, to generate a plurality of second correlation values. That plurality of trial chip sequences may for example be the same plurality of rotated trial chip sequences that was used in the first detection phase. Alternatively, in an embodiment in which the second chip sequence is the direct successor to the first chip sequence (corresponding to the choice P=0 mentioned above in regard to FIG. 3), the second chip sequence may be correlated against the same trial chip sequence that produced, in block S04, the highest correlation value.

It may then be determined whether at least one of the thus determined second correlation values exceeds a defined threshold value. That threshold value may be the same as the threshold value used in block S04 of the first detection phase.

If in block S07 none of the determined correlation values of the second detection phase exceeds this threshold value, the process flow may proceed in block S05. That is, an operating mode of the antenna unit may again be changed. For instance, a new set of one or more antennas may be selected as active antennas. If, however, it is determined in block S07 that at least one of the one or more correlation values of the second detection phase exceeds the defined threshold value, the operating mode of the antenna unit 12 may remain unchanged.

The chip stream generated from the received radio frequency signal may be further analyzed to determine whether it contains a preamble (block S08). If no preamble is detected, the process flow may return to block S02.

If, however, a preamble is detected, it may be determined, e.g. in block S09, whether the chip stream further contains a preamble of a data packet of a protocol of a lower level. For instance, it may be determined whether it contains the beginning of a frame. In other words, following a preamble detection (block S08), a frame may be detected (block S09). A data packet contained in the detected frame may then be decoded (block S10). The packet may contain a payload. If in block S10 some of the received data may not be decoded due to loss of the received radio frequency signal for instance, the method may continue in block S02.

The method may end, for example, with switching off the receiver (block S11).

The device and method described above may notably be used to implement a fast antenna diversity (FAD) mode. This mode, when enabled, may for example allow to select one antenna among two antennas as an active antenna during a preamble phase of the received signal.

By continually monitoring the received signal, the control unit 36 may select the first antenna on which the received signal has a correlation value above a predefined programmable threshold. The control unit 36 may sequentially switch between the two antennas 16 and 18 to test for the presence of a sufficiently strong S0 symbol. The first antenna to meet this condition may then be selected for the selection of the data packet.

The first antenna may be monitored, for example, for a period having a length of one symbol, i.e. for one symbol period. The symbol period may for example be $T_S=16$ μs. Then the antenna monitoring may be switched to the second antenna after a switching time of e.g. $T_a=8$ μs. The switching time $T_a$ may be required to allow for external pin diodes to turn on/off, respectively, for selecting the specific antenna. The sum of $T_S+T_a=24$ μs may allow enough time for testing both antennas within the first four preamble symbols. The total time for testing both antennas 16 and 18 may thus be $T_{fad}=T_a+T_S+T_a+T_S+T_a=3\times T_a+2\times T_S=56$ μs. The monitoring time $T_{fad}$ may thus be shorter than four symbol periods: $T_{fad}<4\times T_S<64$ μs.

The control unit 36 may repeatedly switch between the two antennas 16 and 18 until one is found which provides a sufficiently strong S0 symbol. As the monitoring period may be shorter than four S0 symbols before the antenna is selected, the receiving device 10 may then still detect at least four S0 symbols before declaring "preamble detect".

The correlation unit 28 may run during the switching period $T_a$ to calculate a maximum correlation value for the currently active antenna 16 or 18. Since this period is not guaranteed to coincide with one unique symbol, the correlation unit may work across symbols, as explained above. That is, the correlation unit 28 may rotate the encoded S0 symbol, that is the chip sequence representing the S0 symbol, through all of its N, e.g. 32, combinations in order to detect the S0 symbols split across to subsequent symbols.

It is noted that an antenna receiving zero signal may produce the highest correlation value, as zero signal may be indistinguishable from a clear channel. Thus, an antenna producing the highest correlation value may not necessarily deliver a better output than an antenna for which a lower correlation value is obtained. For this reason the first antenna for which a correlation value above the defined threshold is obtained may be selected.

In summary, a fast signal detection device and method are proposed. The system and the method are based on the presence of a DSSS signal rather than on an energy level of the received electromagnetic wave. This method may be more reliable notably in situations in which an energy level of the received electromagnetic wave is mainly due to background noise.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may be transitory or non-transitory and include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the control unit 36 may be implemented by units distributed over the units 28, 30, 32, and 34.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the signal processing unit 14 may be a single integrated circuit. Alternatively, the examples may be implemented as any number of separate integrated circuits or separate devices interconnected with each other in a suitable manner. For example, the units 24 and 26 may be implemented as separate circuits which are connected to the correlation unit 28.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A direct-sequence spread spectrum signal receiving device, comprising:
   a receiver unit arranged to extract, in a first detection phase, a chip stream from a radio-frequency signal, said chip stream comprising a first chip sequence having a length of one symbol;
   a chip sequence generating unit arranged to generate, in said first detection phase, a plurality of trial chip sequences on the basis of a first trial chip sequence representing a first trial symbol and on the basis of a plurality of index rotations, each trial chip sequence being index-rotated relative to said first trial chip sequence by one of said index rotations;
   a correlation unit arranged to determine, in said first detection phase, a plurality of first correlation values on the basis of said plurality of trial chip sequences and on the basis of said first chip sequence, each of said first correlation values indicating a degree of correlation between a respective one of said trial chip sequences and said first chip sequence; and
   a comparison unit arranged to determine, in said first detection phase, whether a maximum one of said first correlation values exceeds a defined threshold value;
   wherein said receiver unit is further arranged to initiate a second detection phase in response to said maximum correlation value exceeding said threshold value,
   wherein said correlation unit is further arranged to determine, in said second detection phase, a plurality of second correlation values on the basis of said plurality of trial chip sequences and on the basis of a second chip sequence contained in said chip stream, said second chip sequence having a length of one symbol, each of said second correlation values indicating a degree of correlation between a respective one of said trial chip sequences and said second chip sequence,
   wherein said comparison unit is further arranged to determine, in said second detection phase, whether a maximum one of said second correlation values exceeds said defined threshold value.

2. The receiving device of claim 1, wherein said chip sequence generating unit comprises:
   an encoding unit arranged to generate, in said first detection phase, said first trial chip sequence by applying a spreading code to said first trial symbol.

3. The receiving device of claim 1, wherein said first trial symbol is part of a preamble of a data packet.

4. The receiving device of claim 1, further comprising:
   an antenna unit comprising one or more antennas for receiving said radio-frequency signal; and
   an antenna control unit arranged to select another operating mode of said antenna unit in response to said maximum correlation value being below said threshold value.

5. The receiving device of claim 4, wherein said antenna unit has at least two different operating modes, each of said operating modes being characterized by a set of active antennas, an orientation of said antennas, or a combination thereof.

6. The receiving device of claim 4, wherein said selecting another operating mode comprises deactivating one and activating another one of said antennas.

7. The receiving device of claim 1, further comprising:
   a power control unit arranged to set said receiving device into a sleep mode in response to said maximum correlation value being below said threshold value.

8. The receiving device of claim 1, wherein said first chip sequence and said second chip sequence are subsequent chip sequences or partly overlapping chip sequences.

9. The receiving device of claim 1, further arranged to initiate a decoding phase in response to said maximum second correlation value exceeding said threshold value.

10. The receiving device of claim 9, wherein:
    said chip sequence generating unit is arranged to generate, in said decoding phase, a plurality of third trial chip sequences representing a plurality of trial symbols;
    said correlation unit is arranged to determine, in said decoding phase, a plurality of third correlation values on the basis of said plurality of trial chip sequences and on the basis of a third chip sequence contained in said chip stream, said third chip sequence having a length of one symbol, each of said third correlation values indicating a degree of correlation between a respective one of said third trial chip sequences and said third chip sequence; and
    said comparison unit is arranged to determine, among said plurality of trial symbols, the trial symbol associated with the highest one of said third correlation values.

11. The receiving device of claim 10, arranged to repeat said decoding phase at a symbol rate of said chip stream.

12. The receiving device of claim 1, arranged to operate in accordance with a ZigBee protocol.

13. A method comprising:
    selecting a first set of at least one antenna as an active antenna;
    correlating a first chip sequence against each of a plurality of first trial chip sequences to produce a set of first correlation values, wherein each of the first trial chip sequences is a rotated version of a defined symbol value;
    when none of the first correlation values exceeds a first defined threshold value, selecting a second set of at least one antenna as the active antenna;
    when at least one of the first correlation values exceeds the first defined threshold value, providing a second chip sequence based on the first chip sequence and correlating the second chip sequence against each of a plurality of second trial chip sequences to produce a set of second correlation values;
    when none of the second correlation values exceeds a second defined threshold value, selecting the second set of at least one antenna as the active antenna;
    when at least one of the second correlation values exceeds the second defined threshold value, determining whether the second chip sequence contains a preamble;
    when the second chip sequence is determined to contain the preamble, determining whether the second chip sequence contains a lower level preamble of a data packet of a protocol of a lower level;
    when the second chip sequence is determined to contain the lower level preamble, decoding the data packet of the protocol of the lower level.

14. The method of claim 13 further comprising:
    prior to the correlating the first chip sequence against each of the plurality of the first trial chip sequences, waiting a first period of greater than one symbol period to obtain the first chip sequence.

15. The method of claim 14 further comprising:
following the correlating the first chip sequence against each of the plurality of the first trial chip sequences, waiting a second period of less than one symbol period to obtain the second chip sequence.

16. The method of claim 13 further comprising:
in response to the decoding the data packet of the protocol of the lower level, switching off a receiver that received a direct sequence spread spectrum (DSSS) signal from which the first chip sequence was obtained.

17. A non-transitory computer program product, comprising code portions for executing steps of a method as claimed in claim 13 when run on a programmable apparatus.

* * * * *